Dec. 25, 1923.
S. C. SMITH
1,478,923
CAR BRAKE AND CAR MECHANISM
Filed Feb. 12, 1923
4 Sheets-Sheet 1
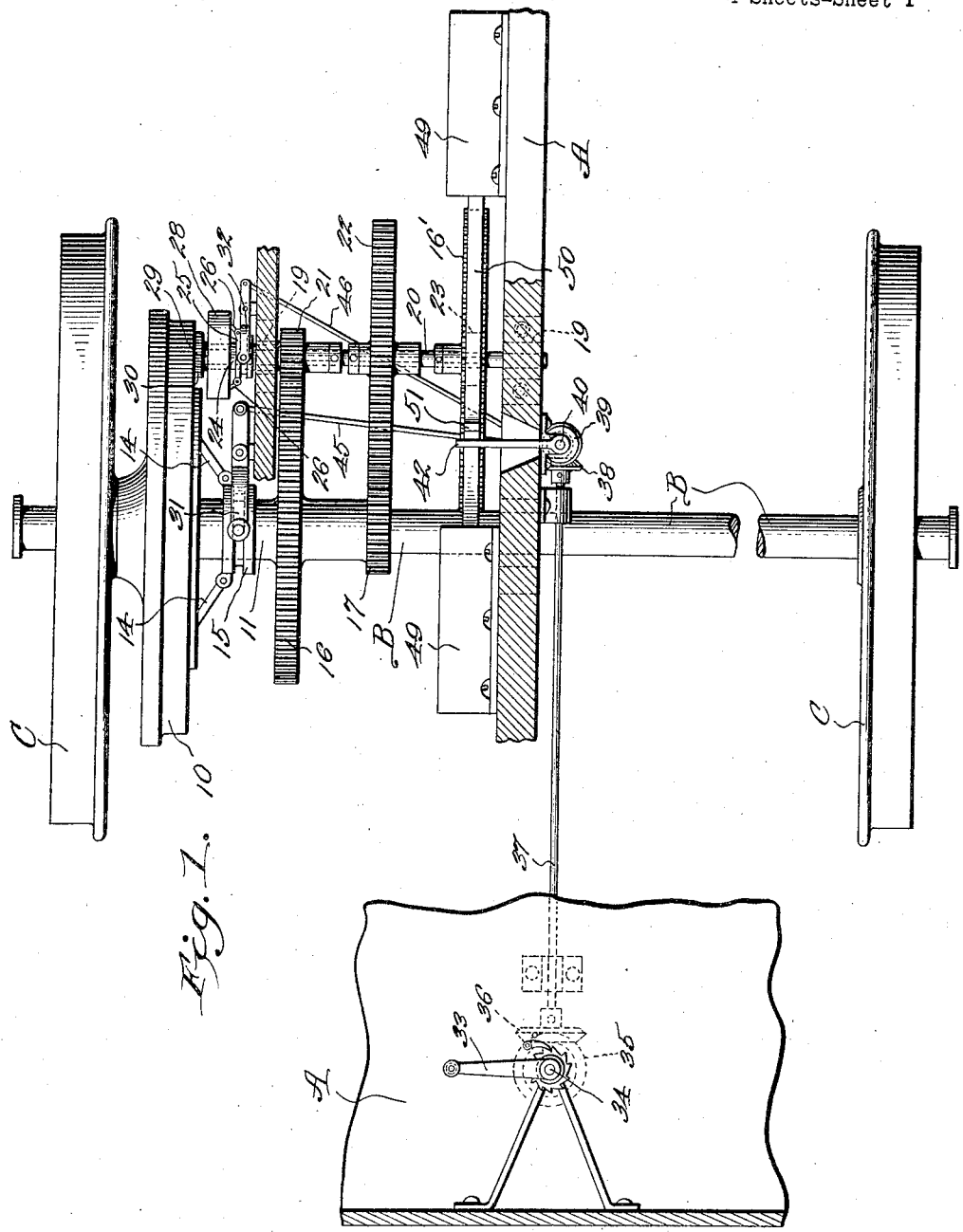

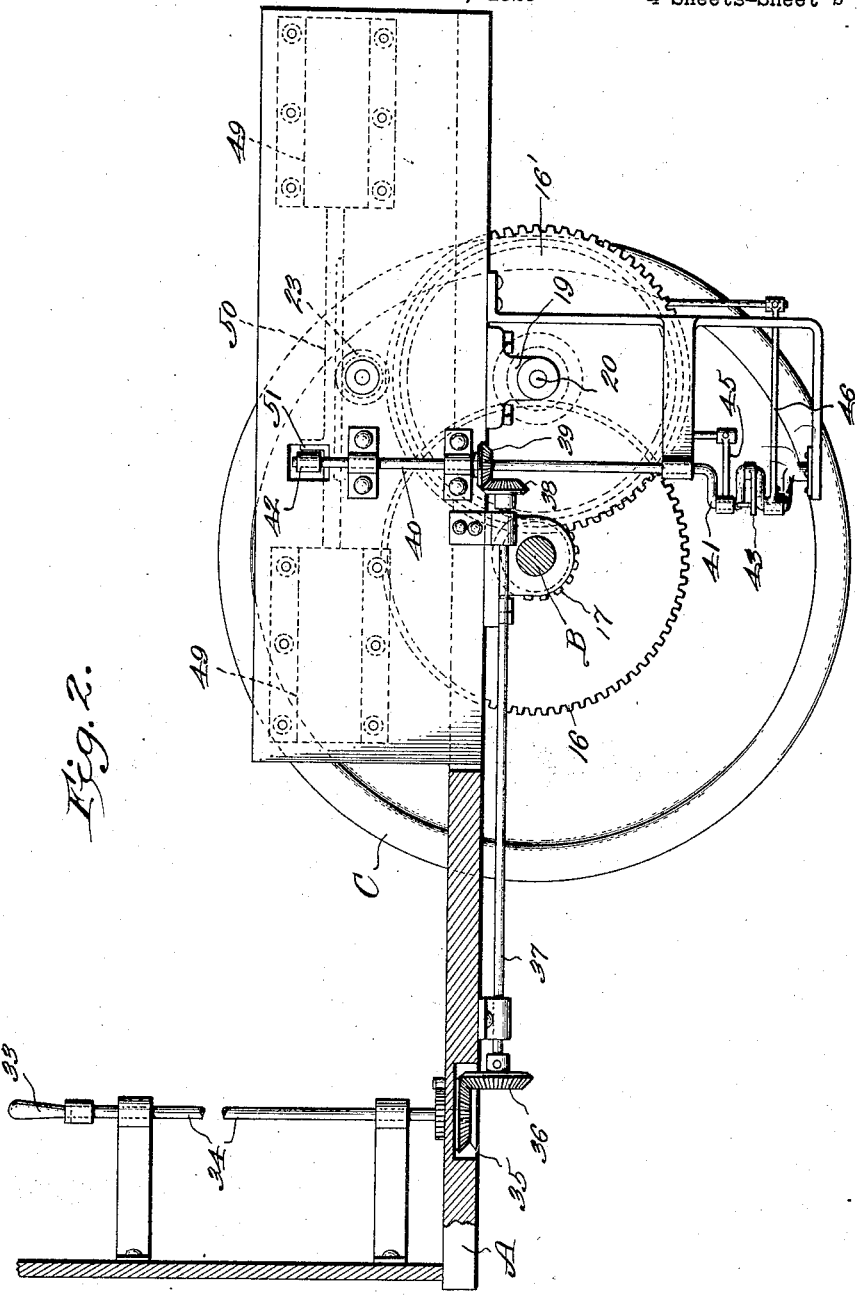

Dec. 25, 1923.
S. C. SMITH
1,478,923
CAR BRAKE AND CAR MECHANISM
Filed Feb. 12, 1923    4 Sheets-Sheet 3
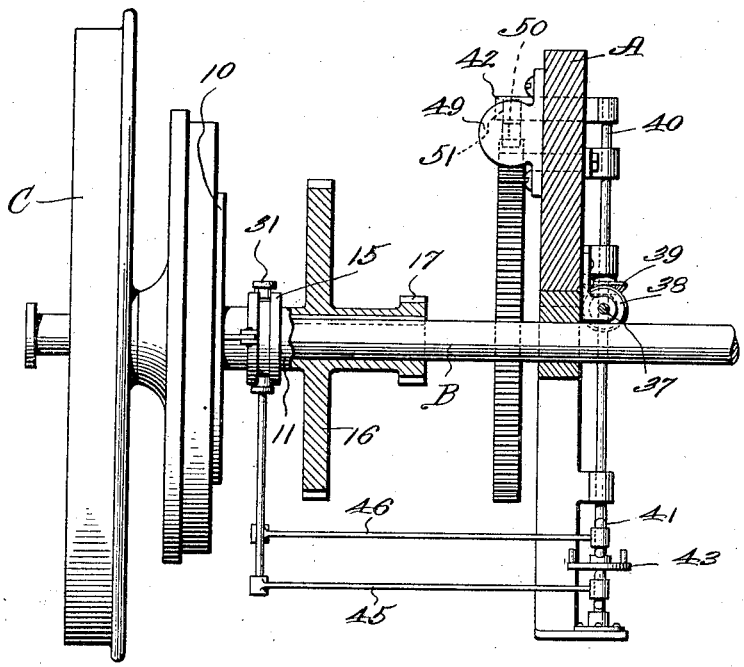
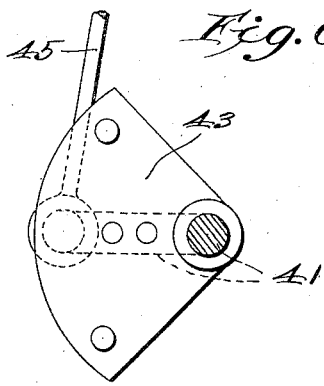
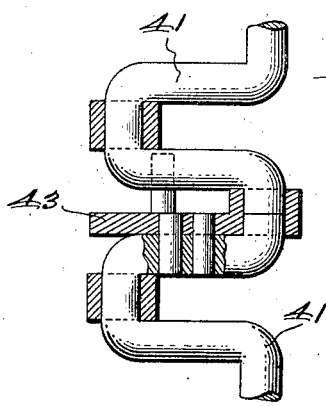

Dec. 25, 1923.

S. C. SMITH 1,478,923

CAR BRAKE AND CAR MECHANISM

Filed Feb. 12, 1923

4 Sheets-Sheet 4

S. C. Smith,
INVENTOR

BY Victor J. Evans
ATTORNEY

WITNESSES

Patented Dec. 25, 1923.

1,478,923

UNITED STATES PATENT OFFICE.

SAMUAL C. SMITH, OF ALGIERS, LOUISIANA.

CAR BRAKE AND CAR MECHANISM.

Application filed February 12, 1923. Serial No. 618,654.

*To all whom it may concern:*

Be it known that I, SAMUAL C. SMITH, a citizen of the United States, residing at Algiers, in the parish of Orleans and State of Louisiana, have invented new and useful Improvements in Car Brakes and Car Mechanism, of which the following is a specification.

This invention relates to the running gear of cars and the like and has for its object the provision of a novel brake mechanism which will entirely eliminate the use of the ordinary brake shoes and operating mechanism therefor and which will have the additional advantage of storing up the energy consumed in stopping the car and utilizing this energy in the starting.

An important object is the provision of a device of this character including a friction clutch device associated with the wheels and operating to drive means for compressing springs which are placed under tension by the power used in stopping the car and which are subsequently releasable whereby to utilize this stored up energy.

The invention has for its further object the provision of novel control mechanism by means of which the starting and stopping may be readily effected, the control mechanism and in fact the entire construction being comparatively simple and inexpensive in manufacture, easy to install, efficient and durable in use and a general improvement in the art.

Figure 4:
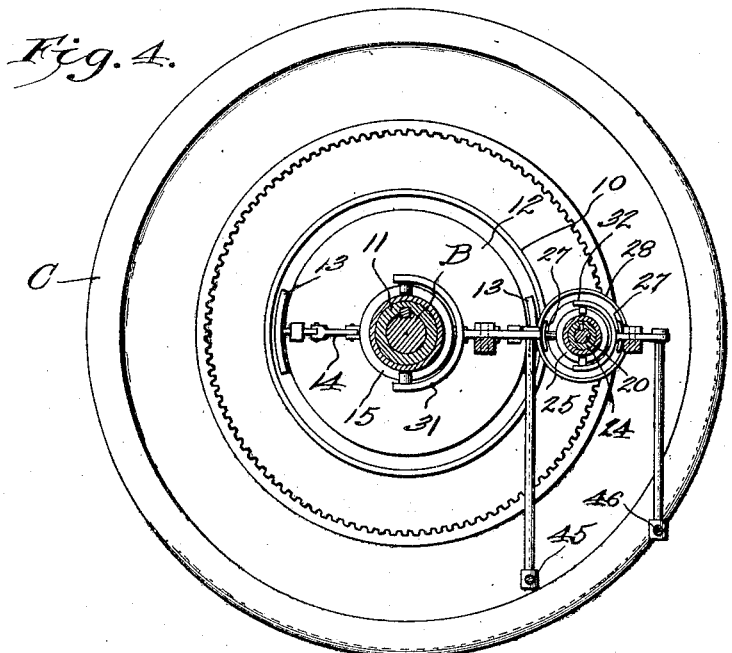
Figure 5:
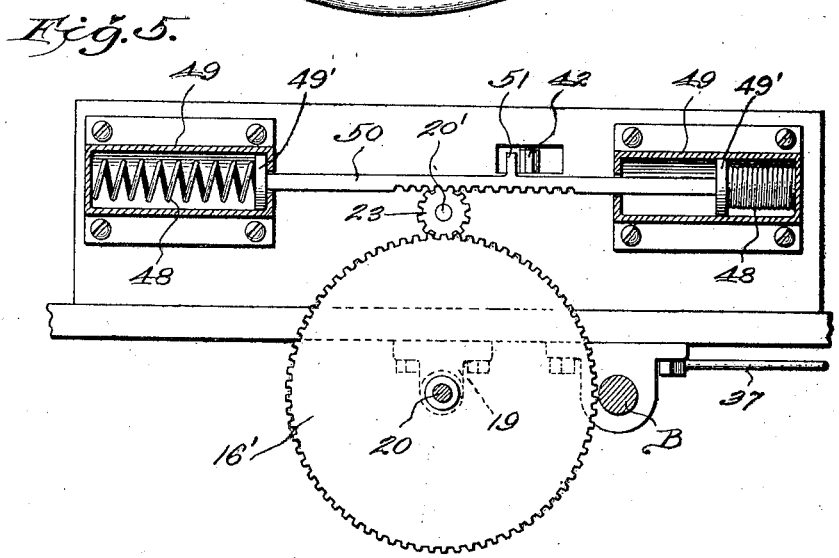

With the above and other objects and advantages in view the invention consists in the details of construction to be hereinafter more fully described and claimed and illustrated in the accompanying drawings, in which:

Figure 1 is a plan view showing my invention applied to the axle of a car, a portion of the car structure being in section, Figure 2 is a side elevation of my device, the car axle being in section and the forward wheel being removed to expose my mechanism, Figure 3 is a vertical section at right angles to Figure 2 taken along the car axle, Figure 4 is a cross sectional view taken through the clutch shifting collars, Figure 5 is a section taken transversely of the axle and along the cylinders which contain the spring pressed plungers, Figure 6 is a detail section showing the segmental plate and associated connecting rod and Figure 7 is a detail view of the crank portion of the vertical shaft.

Referring more particularly to the drawings the letter A designates a portion of a car and B designates an axle thereof carrying the usual wheels C. Secured upon the axle near one wheel is the outer drum 10 of a clutch device which includes a sleeve 11 rotatable upon the axle and carrying a disk 12 upon which are suitably mounted friction shoes 13 adapted to co-operate with the drum 10 and having connected therewith links 14 which are in turn pivotally connected with a grooved collar 15 slidable upon the sleeve 11. Formed on the sleeve is a relatively large gear 16 and a pinion 17. The drum 10 is formed upon an internal gear 18.

Spaced from the axle and journaled in suitable bearings 19 is a shaft 20 carrying a pinion 21 and a relatively large gear 22 which meshes with the pinion 17. This shaft also carries a pinion 23 which meshes with the gear 16. Keyed upon the shaft 20 is a sleeve 24 upon which is splined a grooved collar 25 from which extend pivoted links 26 which carry friction shoes 27 co-operating with the inside of a drum 28 carried by a hollow shaft 29 which is provided with a pinion 30 meshing with the internal gear 18.

Engaging the grooved collar 15 is a pivoted fork 31 while engaging the collar 26 is a similar fork 32.

The operating means consists of the usual crank 33 carried by a shaft 34 provided with a beveled gear 35 meshing with a beveled gear 36 on one end of a horizontal shaft 37 which has its other end carrying a beveled gear 38 meshing with a beveled gear 39 on a vertical shaft 40 which is provided with a crank 41 and a lateral arm 42. The numeral 43 represents a segmental shaped plate which is pivotally mounted as shown and which is engageable by the crank 41 at certain times to be rotated. This segmental plate 43 is connected with the fork 44 by a connecting rod 45. The crank 41 is connected with the fork 32 by a connecting rod 46.

The numeral 49 designates two cylinders within which are located coil springs 48 engaged by followers 49' on the ends of a rack bar 50 which meshes with the pinion 23.

In the operation when it is desired to stop the car, the motorman turns the hand lever 33 which, through the instrumentality of the gearing turns the shaft 40 and as the crank arm 41 and segmental plate 42 are connected by the connecting rods 45 and 46 with the cranks 44 and 32, the grooved collars associated with these forks 32 and 44 will engage the friction shoes 27 and 13 with the drums 28 and 10 respectively, the rack bar 50 being moved longitudinally and one spring 48 being compressed. Now when the car has come to a stop the motorman turns the crank 33 far enough to engage the friction shoes 27 with the drum 28. When ready to start the motorman turns the crank 33 far enough to disengage the friction shoes 13 from the drum 10 while the shoes 27 are still in engagement with the drum 28. Then the power stored in the previously compressed spring 48 is delivered to the pinion 21, and through the gears and small clutch structure so that the pinion 30 meshing with the gear 18 will utilize this power for rotating the axle. After the car has been thus started and the motorman applies the power of whatever motor is used, a stud 51 on the rack bar 50 will engage the arm 42 on the crank shaft to return the latter to initial position and the operation is then complete.

From the foregoing description and a study of the drawings it will be apparent that I have thus provided a simply constructed and easily installed brake mechanism and power saving device for street cars and the like, the brake mechanism being of the friction clutch type and avoiding the use of the ordinary and well known brake shoe construction and the arrangement being of such a character that the energy consumed in bringing the car to a stop will be stored up for subsequent application to effect starting.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. In combination with the axle of a car, a combined brake and power saving mechanism comprising a gear secured upon the car axle and having a clutch drum, a sleeve rotatable upon the axle and carrying friction shoes co-operating with said drum, a second shaft, a hollow shaft rotatable on said second named shaft and carrying a pinion meshing with said gear and carrying a clutch drum, friction shoes carried by the second named shaft engageable with the second named drum, gear connections between both of said shafts, and a spring compressing mechanism operated by said second named shaft.

2. In combination with the axle of a car, a combined brake and power saving mechanism comprising a gear secured upon the car axle and having a clutch drum, a sleeve rotatable upon the axle and carrying friction shoes co-operating with said drum, a second shaft, a hollow shaft rotatable on said second named shaft and carrying a pinion meshing with said gear and carrying a clutch drum, friction shoes carried by the second named shaft engageable with the second named drum, gear connections between both of said shafts, and a spring compressing mechanism operated by said second named shaft, consisting of a pair of cylinders, springs therein, and a rack bar meshing with a pinion on said second named shaft and carrying followers engaging said springs.

3. In combination with the axle of a car, a combined brake and power saving mechanism comprising a gear secured upon the car axle and having a clutch drum, a sleeve rotatable upon the axle and carrying friction shoes co-operating with said drum, a second shaft, a hollow shaft rotatable on said second named shaft and carrying a pinion meshing with said gear and carrying a clutch drum, friction shoes carried by the second named shaft engageable with the second named drum, gear connections between both of said shafts, and a spring compressing mechanism operated by said second named shaft, and manual means for controlling the movement of said friction shoes.

4. In combination with the axle of a car, a combined brake and power saving mechanism comprising a gear secured upon the car axle and having a clutch drum, a sleeve rotatable upon the axle and carrying friction shoes co-operating with said drum, a second shaft, a hollow shaft rotatable on said second named shaft and carrying a pinion meshing with said gear and carrying a clutch drum, friction shoes carried by the second named shaft engageable with the second named drum, gear connections between both of said shafts, and a spring compressing mechanism operated by said second named shaft, and manual means for controlling the movement of said friction shoes, consisting of an operating shaft provided with a crank handle, a crank shaft driven from said operating shaft, and having a crank portion and a segmental plate engaged thereby, and forks pivotally mounted and engaging grooved collars associated with the respective friction shoes, and connecting rods connected with the respective forks and with said crank and segmental plate.

In testimony whereof I affix my signature.

SAMUAL C. SMITH.